US011968769B1

United States Patent
Qiu et al.

(10) Patent No.: US 11,968,769 B1
(45) Date of Patent: Apr. 23, 2024

(54) DIELECTRIC BARRIER DISCHARGING TUBE HAVING SYNERGISTIC COLUMN OF NEEDLE ELECTRODES UTILIZING MULTI-CHANNELS TO ADSORB CATALYSTS

(71) Applicant: HANGZHOU CITY UNIVERSITY, Hangzhou (CN)

(72) Inventors: Qi Qiu, Hangzhou (CN); Pengfei Wang, Hangzhou (CN); Qinmin Yang, Hangzhou (CN); Hao Chen, Hangzhou (CN)

(73) Assignee: HANGZHOU CITY UNIVERSITY, Hangzhou (CN)

( * ) Notice: Subject to any disclaimer, the term of this patent is extended or adjusted under 35 U.S.C. 154(b) by 0 days.

(21) Appl. No.: 18/391,679

(22) Filed: Dec. 21, 2023

(30) Foreign Application Priority Data

Mar. 3, 2023 (CN) .......................... 202310194717.3

(51) Int. Cl.
*H05H 1/24* (2006.01)
(52) U.S. Cl.
CPC .................................. *H05H 1/245* (2021.05)
(58) Field of Classification Search
CPC ......... H05H 1/245; H01J 27/00; H02K 44/08; H03L 7/26
See application file for complete search history.

(56) References Cited

U.S. PATENT DOCUMENTS

| 11,786,863 B1 * | 10/2023 | Qiu .................... B01J 19/088 422/186.04 |
| 2003/0141182 A1 | 7/2003 | Steffen et al. |

FOREIGN PATENT DOCUMENTS

| CN | 102179145 A | | 9/2011 | |
| CN | 101518713 B | * | 7/2012 | |
| CN | 202921165 U | | 5/2013 | |
| CN | 105333514 A | * | 2/2016 | |
| CN | 106823707 A | | 6/2017 | |
| CN | 107413175 A | * | 12/2017 | ............. B01D 53/04 |
| CN | 207884958 U | | 9/2018 | |
| CN | 108722700 A | | 11/2018 | |
| CN | 110385020 A | | 10/2019 | |
| CN | 112919424 A | * | 6/2021 | ............. C01B 13/11 |
| CN | 114797406 A | | 7/2022 | |
| KR | 20140117900 A | | 10/2014 | |
| WO | WO-2013060080 A1 | * | 5/2013 | ............. B01J 19/088 |

* cited by examiner

*Primary Examiner* — Abdullah A Riyami
*Assistant Examiner* — Syed M Kaiser

(57) ABSTRACT

A dielectric barrier discharging tube, which has a synergistic column of needle electrodes to utilize a plurality of channels to adsorb catalysts, is provided. The dielectric barrier discharging tube includes: a quartz tube, a high-voltage pole, an inner electrode, and a plurality discharging needle sets. Two catalytic blocks are arranged respectively on two sides of each set discharging needles. Each catalytic block defines at least one inclined inner channel and at least one inclined outer channel. A higher end of each channel faces towards the discharging needle, and a lower end of each channel faces towards the discharging needle.

8 Claims, 2 Drawing Sheets

DIELECTRIC BARRIER DISCHARGING TUBE HAVING SYNERGISTIC COLUMN OF NEEDLE ELECTRODES UTILIZING MULTI-CHANNELS TO ADSORB CATALYSTS

CROSS REFERENCE TO RELATED APPLICATIONS

The present application is a continuation-application of Chinese patent application No. 202310194717.3, filed on Mar. 3, 2023, and contents of which are incorporated herein by its entireties.

TECHNICAL FIELD

The present disclosure relates to the field of dielectric barrier discharging, and in particular to a dielectric barrier discharging tube having a synergistic column of needle electrodes to utilize a plurality of channels to adsorb catalysts.

BACKGROUND

The low temperature plasma technology, as a widely applicable new technology to remove exhaust gas/odor, has received extensive attention worldwide in past decades. An operation principle of removing the exhaust gas/odor is as follows. When a high-voltage electric field is applied, a large number of high-energy electrons are generated due to discharging to bombard target gas molecules to ionize, dissociate, and excite the target gas molecules. At the same time, discharging produces hydroxyl groups, ozone, and other strong oxidizing substances. This combined effect allows the gas of large molecule to converted into simple small molecules or allows toxic and harmful substances to be converted into non-toxic and harmless or less toxic and less harmful substances. For the dielectric blocked discharging (DBD), a higher density of energetic particles is generated, and the DBD may operate stably. Therefore, DBD reactors are widely used in laboratories and industries. In order to reduce energy consumption of the low-temperature plasma and to improve selectivity and a treatment effect, plasma coupled with adsorbents and catalysts has become a research hotspot and is gradually applied in practice.

Generally, the adsorbents and the catalysts are placed in a discharging region, and may be powders or granules. An additional fixing or storage structure is required for the adsorbents and the catalysts. Filling the granules directly in the discharging region may generate a large resistance against gas flow. In some cases, the catalysts are arranged inside the reactor by being coated or adhered to an electrode or a dielectric layer. For example, the Chinese patent publication No. CN106807242A discloses a dual-dielectric barrier discharging device having a catalytic coating to treat the exhaust gas. The catalytic layer is directly coated on a surface of a dielectric plate of the device. Although obstruction against the gas flow is reduced, the catalytic and adsorption effects are poorer than those of a device having the catalysts filled therein. Further, the coated catalytic layer of the device cannot be maintained for a long time.

SUMMARY OF THE DISCLOSURE

The present disclosure provides a dielectric barrier discharging tube having a synergistic column of needle electrodes to utilize a plurality of channels to adsorb catalysts. In the present disclosure, the obstruction against gas flow is reduced, a mixing and mingling effect of gases is improved, and therefore, a treatment effect on the gas caused by discharging needles is improved, and the effect can be maintained for a long time.

The present disclosure provides a dielectric barrier discharging tube having a synergistic column of needle electrodes to utilize a plurality of channels to adsorb catalysts. The dielectric barrier discharging tube comprises: a quartz tube, a high-voltage pole, an inner electrode, and a plurality discharging needle sets. The high-voltage pole is arranged at an outside of the quartz tube; the inner electrode is arranged inside the quartz tube; the plurality of discharging needle sets are arranged on a surface of the inner electrode. Two catalytic blocks are arranged respectively on two sides of each set of the plurality of discharging needle sets; each catalytic block comprises a block body; surfaces of the block body define at least one inclined inner channel extending through a thickness of the block body. A higher end of each inner channel faces towards a corresponding one discharging needle of the discharging needle sets; a circumferential side wall of the block body defines at least one inclined outer channel; a lower end of each outer channel faces towards a corresponding one discharging needle of the discharging needle sets. After gas enters the quartz tube, the gas passes through the inclined outer channel and the inclined inner channel defined in one of the two catalytic blocks disposed at a front of the discharging needle, the gas out of the inclined outer channel and the inclined inner channel converge to a discharging region where the discharging needle is located, a rotating flow field is formed in the discharging region, and the gas flowing out of the inner channel and the gas flowing out of the outer channel collide with each other. After the gas passes through the discharging region, the gas enters the outer channel and the inner channel defined in the other one of the two catalytic blocks located at a back of the discharging needle, a U-shaped flow field is generated between the gas and the catalytic block at the back of the discharging needle. The gas flowing out of the outer channel flows in a direction away from the inner electrode, collides an inner wall of the quartz tube, and flows back toward a middle of the quartz tube, such that the U-shaped flow field is generated. The gas flowing out of the inner channel flowing towards the inner electrode, collides with the surface of the inner electrode, and flows away from the inner electrode, such that the U-shaped flow field is generated.

In some embodiments, catalytic block is made of ZSM-5 zeolite molecular sieve, and has a columnar structure.

In some embodiments, a diameter of an end of the outer channel disposed near the corresponding discharging needle is greater than a diameter of another end of the outer channel disposed away from the corresponding discharging needle; a diameter of an end of the inner channel disposed near the corresponding discharging needle is greater than a diameter of another end of the inner channel disposed away from the corresponding discharging needle. When the gas passes through the catalytic block located at the front of the discharging needle, the diameters of the outer channel and the inner channel gradually increase, a flowing rate of the gas gradually decreases, and a time length of the gas staying at the discharging region where the corresponding discharging needle is located is prolonged. When the gas passes through the catalytic block located at the back of the discharging needle, the diameters of the outer channel and the inner channel gradually decrease, the flowing rate of the gas gradually increases, a gas mixing effect of the U-shaped flow field is improved.

In some embodiments, the at least one inner channel are circumferentially distributed on the catalytic block, having an equal interval distance; the at least one outer channel are circumferentially distributed on the catalytic block, having an equal interval distance. The at least one inner channel are staggered with the at least one outer channel.

In some embodiments, the circumferential side wall of the catalytic block contacts the inner wall of the quartz tube.

In some embodiments, the high-voltage pole is a stainless steel mesh and completely covers all of the plurality of discharging needle sets.

In some embodiments, each inner channel is in a trumpet-like shape; and each outer channel is a curved slot.

In some embodiments, the inner electrode is made of aluminum.

According to the present disclosure, following technical effects can be achieved.

1. In the present disclosure, two catalytic blocks are arranged respectively on two sides of one discharging needle set. Each catalytic block includes a block body. A surface of the block body defines an inclined inner channel extending through the thickness of the block body. A higher end of the inner channel faces a corresponding discharging needle. A circumferential side wall of the block body defines an inclined outer channel. A lower end of the outer channel faces a corresponding discharging needle. After the gas enters the quartz tube, the gas passes through the inclined outer channel and the inclined inner channel disposed in front of the discharging needle, and then the gas converges to the discharging region where the discharging needle is located. A rotating flow field is generated in the discharging region. In addition, the gas flowing out of the inner channel collides with the gas flowing out of the outer channel, such that a fusion effect of the gases in the discharging region is improved. After the gas passes through the discharging region, the gas enters the outer channel and the inner channel located at the back of the discharging needle. AU-shaped flow field is generated between the gas and the catalytic block at the back. In this way, the fusion effect of the gases is further improved. In summary, in the present disclosure, while the catalytic effect is ensured, the obstruction against the gas flow is reduced, the mixing and fusion effect of the gases is improved, such that the treatment effect on the gas caused by the discharging needles is improved and can be maintained for a long time.

2. In the present disclosure, a diameter of an end of the outer channel near the corresponding discharging needle is greater than a diameter of another end of the outer channel away from the corresponding discharging needle; and a diameter of an end of the inner channel near the corresponding discharging needle is greater than a diameter of another end of the inner channel away from the corresponding discharging needle. When the gas passes through the catalytic block located in the front of the discharging needle, the diameters of the outer channel and the inner channel gradually increase, and therefore, a flow rate of the gas gradually decreases. In this way, a time length of the gas staying in the discharging region where the corresponding discharging needle is located may be prolonged, such that the treatment effect on the gas is improved. When the gas passes through the catalytic block located at the back of the discharging needle, the diameters of the outer channel and the inner channel gradually decrease, the flow rate of the gas gradually increases, such that the mixing effect of the U-shaped flow field formed by the gases is improved.

Figure 1:
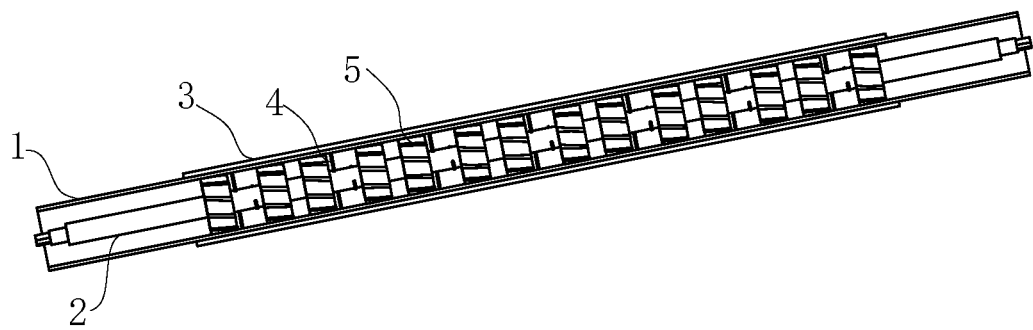
FIG. 1 is a schematic view of the structure according to an embodiment of the present disclosure.

Reference numerals in the drawings: 1 quartz tube; 2 inner electrode; 3 high-voltage pole; 4 discharging needle; 5 catalytic block; 501 block body; 502 outer channel; 503 inner channel.

DETAILED DESCRIPTION

The present disclosure is further described below by referring to the accompanying drawings and embodiments, but the description does not limit the present disclosure.

The present embodiment provides a dielectric barrier discharging tube having a synergistic column of needle electrodes to utilize a plurality of channels to adsorb catalysts. As shown in FIG. 1, the dielectric barrier discharging tube includes: a quartz tube 1, a high-voltage pole 3, an inner electrode 2, and a plurality discharging needle sets 4. The high-voltage pole 3 is arranged at an outside of the quartz tube 1 and is a stainless steel mesh. The inner electrode 2 is arranged inside the quartz tube 1 and is made of aluminum. The plurality of discharging needle sets 4 are arranged on a surface of the inner electrode 2. The high-voltage pole 3 completely covers all of the discharging needles 4.

Figure 2:
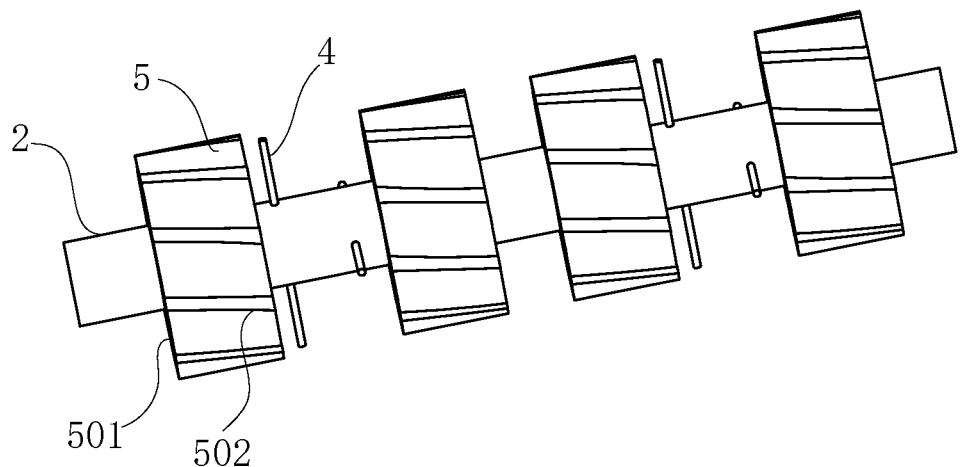
FIG. 2 is a schematic view showing an arrangement of the catalytic blocks and the discharging needles according to an embodiment of the present disclosure.
Figure 3:
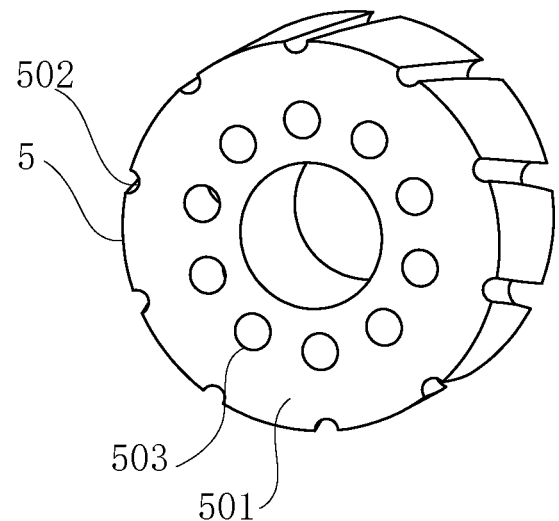
FIG. 3 is a schematic view of a catalytic block according to an embodiment of the present disclosure.

As shown in FIG. 2, two catalytic blocks 5 are arranged respectively on two sides of each discharging needle set 4. Each catalytic block 5 is made of ZSM-5 zeolite molecular sieve. The catalytic block 5 has a columnar structure. As shown in FIG. 3, the catalytic block 5 includes a block body 501. The block body 501 defines at least one inclined inner channel 503 extending through a thickness of the block body 501 from one surface to an opposite surface of the block body 501. Each inner channel 503 is in a trumpet-like shape. A higher end of the inner channel 503 faces toward a corresponding discharging needle 4. That is, a gas inlet end of the inner channel 503 located at a front of the discharging needle is a lower end, and a gas outlet end of the inner channel 503 located at the front of the discharging needle is the higher end. A gas inlet end of the inner channel 503 located at a back of the discharging needle is the higher end, and a gas outlet end of the inner channel 503 located at the back of the discharging needle is the lower end. The lower end is disposed closer to a circle center of the block body 501, and the higher end is located away from the circle center of the block body 501. A circumferential side wall of the block body 501 defines at least one inclined outer channel 502. Each outer channel 502 is a curved slot. A lower end of the outer channel 502 faces towards the corresponding discharging needle 4. That is, a gas inlet end of the outer channel 503 located at the front of the discharging needle is the higher end, and a gas outlet end of the outer channel 503 located at the front of the discharging needle is the lower end. A gas inlet end of the outer channel 503 located at the back of the discharging needle is the lower end, and a gas outlet end of the outer channel 503 located at the back of the discharging needle is the higher end. A plurality of inner channels 503 are circumferentially distributed on the catalytic block 5, having an equal interval distance. A plurality of outer channels 502 are circumferentially distributed on the catalytic block 5, having an equal interval distance. The inner channels 503 and the outer channels 502 are staggered with each other. The circumferential side wall of the catalytic block 5 contacts an inner wall of the quartz tube 1. In this way, the inner channels 503 and outer channels 502 are the only channels that the gas can pass through while flowing through the catalytic block 5. To be noted that, the "front" refers to a location near a gas inlet end of the quartz tube 1, and the "back" or "rear" refers to a location near a gas outlet end of the quartz tube 1. The "higher end" may be interpreted as being higher along the gravitational direction, and the "lower end" may be interpreted as being lower along the gravitational direction. The "inclined" means that an extending direction of the channel is non-parallel to an extending direction of the inner electrode 2.

Figure 4:
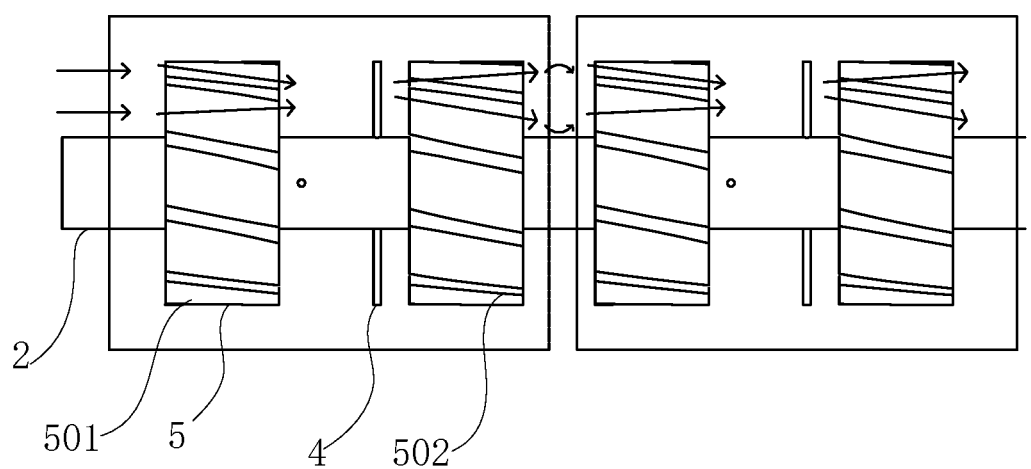
FIG. 4 is a schematic view of a flowing direction of the gases according to an embodiment of the present disclosure.

As shown in FIG. 4, in the drawings, dashed arrows indicate flowing directions of the gas passing through the inner channels 503, and solid arrows indicate flowing directions of the gas passing through the outer channels 502. After the gas enters the quartz tube 1, the gas passes through the inclined outer channel 502 and the inclined inner channel 503 defined in the catalytic block 5 disposed at the front of the discharging needle 4. Gases out of the inclined outer channel 502 and the inclined inner channel 503 converge to a discharging region where the discharging needle 4 is located. Since the flowing directions of the gases change after the gases pass through the inner channel 503 and the outer channel 502, a rotating flow field is formed in the discharging region. The gas flowing out of the inner channel 503 and the gas flowing out of the outer channel 502 collide with each other, improving a gas fusion effect in the discharging region. After the gas passes through the discharging region, the gas enters the outer channel 502 and the inner channel 503 defined in the catalytic block located at the back of the discharging needle 4. A U-shaped flow field is generated between the gas and the catalytic block 5 at the back of the discharging needle 4. The gas fusion effect is further improved. Specifically, the gas flowing out of the outer channel 502 flows in a direction away from the inner electrode 2, collides the inner wall of the quartz tube 1, and subsequently, flows back toward a middle of the quartz tube 1, such that the U-shaped flow field is generated. The gas flowing out of the inner channel 503 flowing towards the inner electrode 2, collides with the surface of the inner electrode 2, and subsequently, flows away from the inner electrode 2, such that the U-shaped flow field is generated.

A diameter of an end of the outer channel 502 disposed near the corresponding discharging needle 4 is greater than a diameter of another end of the outer channel 502 disposed away from the corresponding discharging needle 4. A diameter of an end of the inner channel 503 disposed near the corresponding discharging needle 4 is greater than a diameter of another end of the inner channel 503 disposed away from the corresponding discharging needle 4. When the gas passes through the catalytic block 5 located at the front of the discharging needle 4, the diameters of the outer channel 502 and the inner channel 503 gradually increase, a flowing rate of the gas gradually decreases. In this way, a time length of the gas staying at the discharging region where the corresponding discharging needle 4 is located may be prolonged, and the treatment effect of the gas is improved. When the gas passes through the catalytic block 5 located at the back of the discharging needle 4, the diameters of the outer channel 502 and the inner channel 503 gradually decrease, the flowing rate of the gas gradually increases, such that the gas mixing effect of the U-shaped flow field may be improved.

In summary, in the present disclosure, the catalysts and the adsorbents are made into catalytic blocks 5, and inner channels 503 and outer channels 502 are defined in each catalytic block 5. In this way, while the catalytic effect is ensured, the obstruction against the gas flow is reduced, the mixing and fusion effect of gases is improved, such that the treatment effect on the gas caused by the discharging needles 4 is improved.

The foregoing shows only preferred embodiments of the present disclosure, and does not limit the present disclosure. Any ordinary skilled person in the art may perform various changes and variations. Any modifications, equivalent substitutions, improvements, made within the scope of the claims shall be included in the scope of the present disclosure.

What is claimed is:

1. A dielectric barrier discharging tube having a synergistic column of needle electrodes to utilize a plurality of channels to adsorb catalysts, wherein the dielectric barrier discharging tube comprises: a quartz tube (1), a high-voltage pole (3), an inner electrode (2), and a plurality discharging needle sets (4);
   wherein, the high-voltage pole (3) is arranged at an outside of the quartz tube (1); the inner electrode (2) is arranged inside the quartz tube (1); the plurality of discharging needle sets (4) are arranged on a surface of the inner electrode (2);
   two catalytic blocks (5) are arranged respectively on two sides of each set of the plurality of discharging needle sets (4); each catalytic block (5) comprises a block body (501); surfaces of the block body (501) defines at least one inclined inner channel (503) extending through a thickness of the block body (501);
   a higher end of each inner channel (503) faces towards a corresponding one discharging needle (4) of the discharging needle sets; a circumferential side wall of the block body (501) defines at least one inclined outer channel (502); a lower end of each outer channel (501) faces towards a corresponding one discharging needle (4) of the discharging needle sets;
   after gas enters the quartz tube (1), the gas passes through the inclined outer channel (502) and the inclined inner channel (503) defined in one of the two catalytic blocks (5) disposed at a front of the discharging needle (4), the gas out of the inclined outer channel (502) and the inclined inner channel (503) converge to a discharging region where the discharging needle (4) is located, a rotating flow field is formed in the discharging region, and the gas flowing out of the inner channel (503) and the gas flowing out of the outer channel (502) collide with each other;
   after the gas passes through the discharging region, the gas enters the outer channel (502) and the inner channel (503) defined in the other one of the two catalytic blocks located at a back of the discharging needle (4), a U-shaped flow field is generated between the gas and the catalytic block (5) at the back of the discharging needle (4);
   the gas flowing out of the outer channel (502) flows in a direction away from the inner electrode (2), collides an inner wall of the quartz tube (1), and flows back toward a middle of the quartz tube (1), such that the U-shaped flow field is generated; and
   the gas flowing out of the inner channel (503) flowing towards the inner electrode (2), collides with the surface of the inner electrode (2), and flows away from the inner electrode (2), such that the U-shaped flow field is generated.

2. The dielectric barrier discharging tube according to claim 1, wherein, catalytic block (5) is made of ZSM-5 zeolite molecular sieve, and has a columnar structure.

3. The dielectric barrier discharging tube according to claim 1, wherein a diameter of an end of the outer channel (502) disposed near the corresponding discharging needle (4) is greater than a diameter of another end of the outer channel (502) disposed away from the corresponding discharging needle (4); a diameter of an end of the inner channel (503) disposed near the corresponding discharging needle (4) is greater than a diameter of another end of the inner channel (503) disposed away from the corresponding discharging needle (4);
  when the gas passes through the catalytic block (5) located at the front of the discharging needle (4), the diameters of the outer channel (502) and the inner channel (503) gradually increase, a flowing rate of the gas gradually decreases, and a time length of the gas staying at the discharging region where the corresponding discharging needle (4) is located is prolonged;
  when the gas passes through the catalytic block (5) located at the back of the discharging needle (4), the diameters of the outer channel (502) and the inner channel (503) gradually decrease, the flowing rate of the gas gradually increases, a gas mixing effect of the U-shaped flow field is improved.

4. The dielectric barrier discharging tube according to claim 1, wherein the at least one inner channel (503) are circumferentially distributed on the catalytic block (5), having an equal interval distance; the at least one outer channel (502) are circumferentially distributed on the catalytic block (5), having an equal interval distance; and
  the at least one inner channel (503) are staggered with the at least one outer channel (502).

5. The dielectric barrier discharging tube according to claim 1, wherein the circumferential side wall of the catalytic block (5) contacts the inner wall of the quartz tube (1).

6. The dielectric barrier discharging tube according to claim 1, wherein the high-voltage pole (3) is a stainless steel mesh and completely covers all of the plurality of discharging needle sets (4).

7. The dielectric barrier discharging tube according to claim 1, wherein each inner channel (503) is in a trumpet-like shape; and each outer channel (502) is a curved slot.

8. The dielectric barrier discharging tube according to claim 1, wherein the inner electrode (2) is made of aluminum.

* * * * *